United States Patent [19]
Hibi et al.

[11] Patent Number: 5,769,380
[45] Date of Patent: Jun. 23, 1998

[54] RUBBER VIBRATION ISOLATOR WITH BRACKET AND METHOD OF MANUFACTURING THE SAME

[75] Inventors: Masayuki Hibi, Komaki; Yutaka Tazuke, Kasugai; Masahiko Hanazaki, Nagoya, all of Japan

[73] Assignee: Tokai Rubber Industries, Ltd., Komaki, Japan

[21] Appl. No.: 299,097

[22] Filed: Sep. 2, 1994

[30] Foreign Application Priority Data

Sep. 2, 1993 [JP] Japan ................................. 5-243964
Aug. 31, 1994 [JP] Japan ................................. 5-207330

[51] Int. Cl.⁶ ................................................ F16M 13/00
[52] U.S. Cl. ................................. 248/562; 248/559
[58] Field of Search ............................. 248/559, 635, 248/634, 562; 267/140.12, 141.3, 141.4, 141.5

[56] References Cited

U.S. PATENT DOCUMENTS

| | | | |
|---|---|---|---|
| 4,044,977 | 8/1977 | Feucht | 267/141.3 |
| 4,717,111 | 1/1988 | Saito . | |
| 4,790,520 | 12/1988 | Tanaka | 248/562 X |
| 4,809,960 | 3/1989 | Kakimoto | 248/634 X |
| 4,889,328 | 12/1989 | Uno | 248/559 X |
| 4,944,482 | 7/1990 | Bouhier | 248/559 X |
| 5,058,867 | 10/1991 | Hadano | 248/635 X |
| 5,139,241 | 8/1992 | Hamaekers | 267/141.4 X |
| 5,413,319 | 5/1995 | Hein | 267/141.3 X |

FOREIGN PATENT DOCUMENTS

| | | |
|---|---|---|
| 0 370 524 | 5/1990 | European Pat. Off. . |
| 0 503 654 | 9/1992 | European Pat. Off. . |
| 0 529 629 | 3/1993 | European Pat. Off. . |
| 2 292 153 | 11/1975 | France . |
| 2 626 947 | 2/1989 | France . |
| 41 11 233 | 10/1991 | Germany . |
| 57-94146 | 6/1982 | Japan . |
| 58-170608 | 10/1983 | Japan . |
| 2-46336 | 2/1990 | Japan . |
| 2-29898 | 7/1990 | Japan . |
| 5118369 | 5/1993 | Japan ................................. 248/141.3 |
| 1169645 | 11/1969 | United Kingdom . |

*Primary Examiner*—Leslie A. Braun
*Assistant Examiner*—Willie Berry, Jr.
*Attorney, Agent, or Firm*—Jacobson, Price, Holman & Stern, PLLC

[57] ABSTRACT

A rubber vibration isolator with a bracket and a method of manufacturing the same. An elastic rubber member is vulcanization bonded to both a metallic cylindrical portion and an inner sleeve disposed inside of the cylindrical portion in a first securing portion opposed to an inner surface of the metallic cylindrical portion and a second securing portion opposed to an outer surface of the inner sleeve. Next, the metallic cylindrical portion is plastically deformed towards an axial center thereof to precompress the elastic rubber member. An arm portion is secured to an outer surface of the plastically deformed cylindrical portion by low temperature welding, thereby forming the bracket.

3 Claims, 12 Drawing Sheets

RUBBER VIBRATION ISOLATOR WITH BRACKET AND METHOD OF MANUFACTURING THE SAME

BACKGROUND OF THE INVENTION

1. Field of the Invention

The present invention relates to a rubber vibration isolator provided with a bracket, which is preferably used as a cylindrical engine mount, muffler support or other member needing a bracket, and a method of manufacturing the same.

2. Description of Related Art

One example of a conventional cylindrical engine mount needing a bracket is illustrated in FIGS. 14 through 18.

Figure 14:
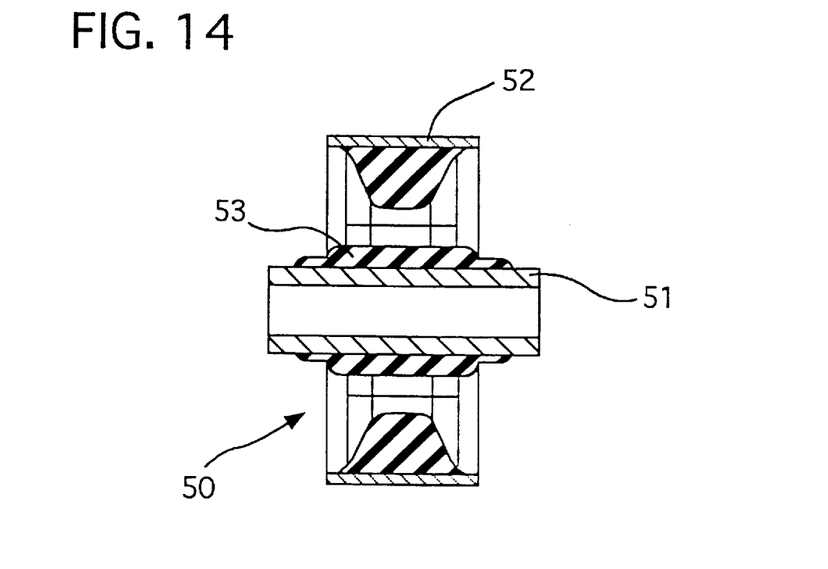
FIG. 14 is a longitudinal sectional view of a conventional rubber vibration isolator which is not precompressed.
Figure 15:
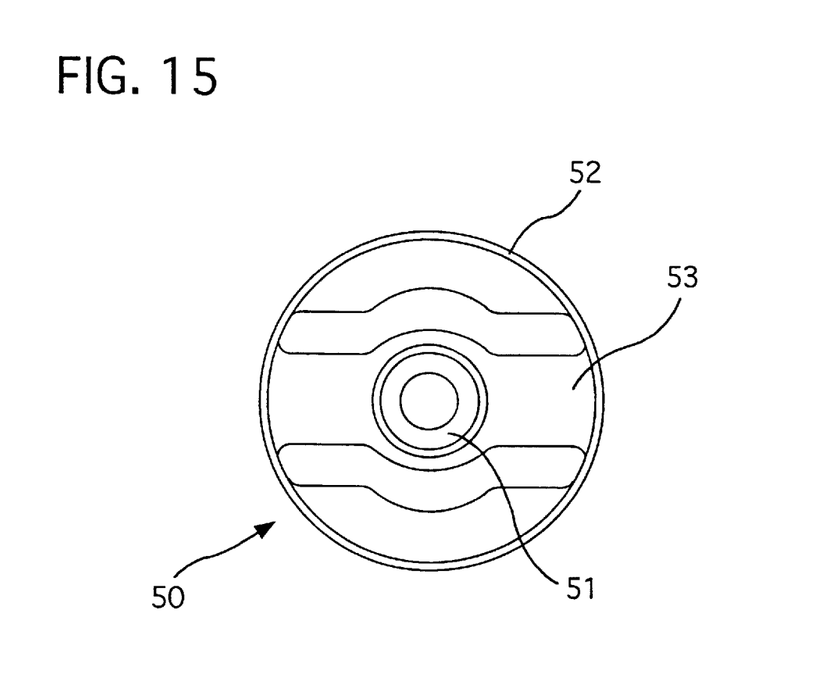
FIG. 15 is a front elevation view of the conventional rubber vibration isolator which is not precompressed.
Figure 16:
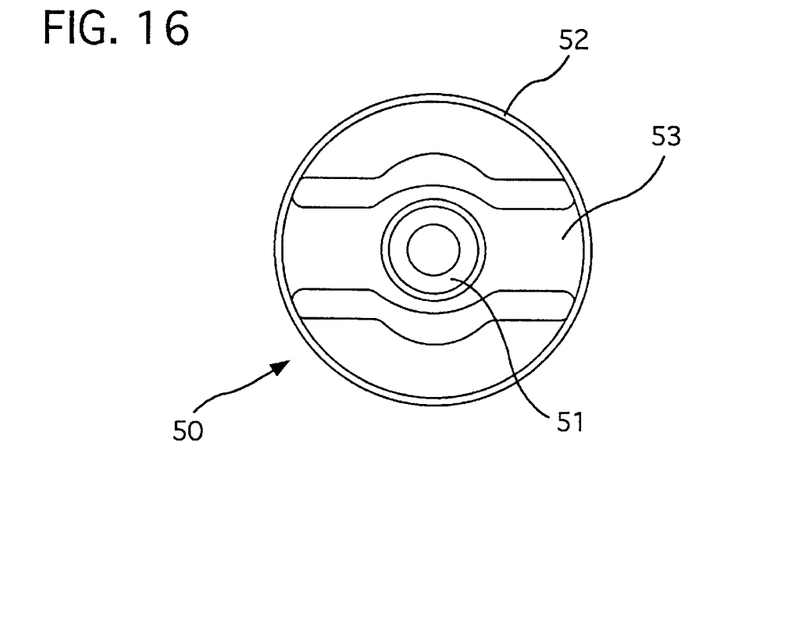
FIG. 16 is a front elevation view of the conventional rubber vibration isolator which Is in the precompressed state.

In order to manufacture the above-described conventional engine mount, as shown in FIGS. 14 to 16, a cylindrical rubber vibration isolator 50 composed of an inner sleeve 51, an outer sleeve 52 and an elastic rubber member 53 bonded to the inner sleeve 51 and the outer sleeve 52 by vulcanization is first formed by using a mold, and then, the durability of the elastic rubber member 53 is improved by drawing the cylindrical rubber vibration isolator 50 from the outside of the outer sleeve 52. Upon drawing, the outer sleeve 52 is plastically deformed to reduce the diameter thereof, thereby precompressing the elastic rubber member 53. Thus, as shown in FIGS. 16, a drawn cylindrical rubber vibration isolator 50' is prepared.

Figure 17:
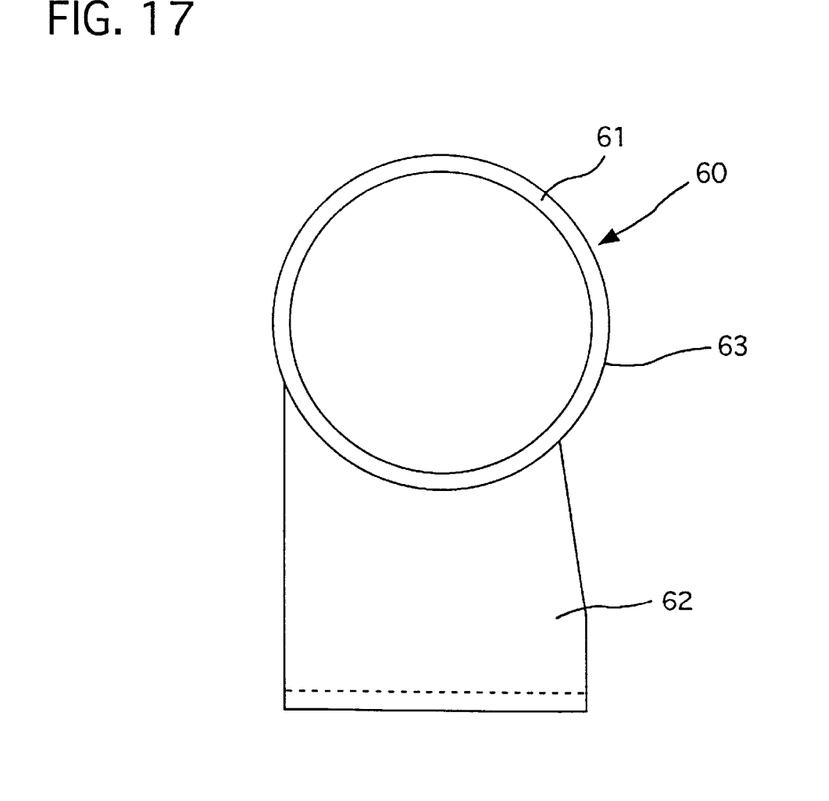
FIG. 17 is a front elevation view of the conventional bracket.
Figure 18:
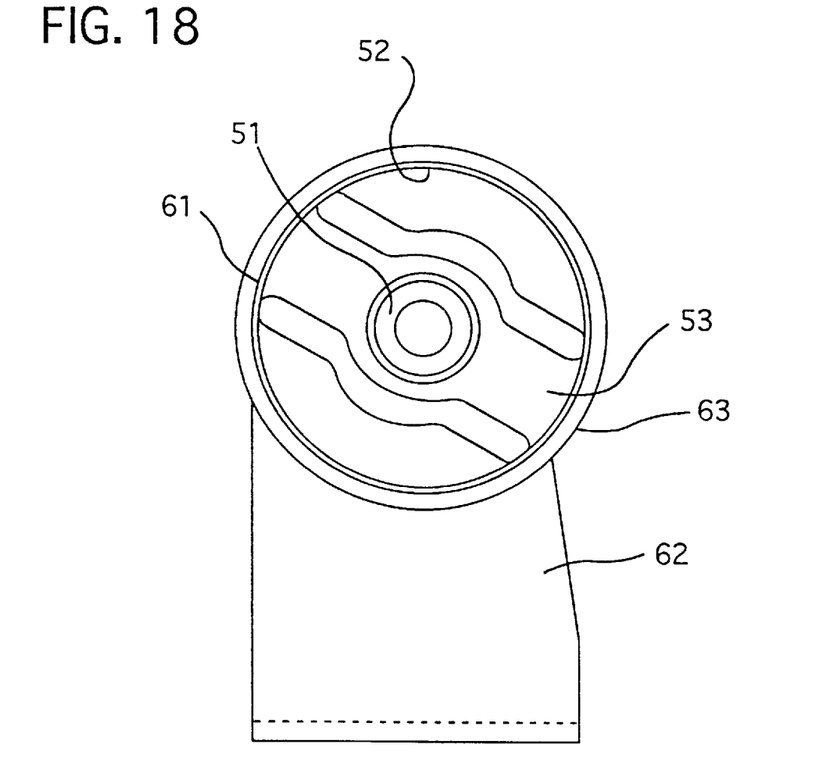
FIG. 18 is a front elevation view of the conventional rubber vibration isolator with a bracket.

As shown in FIG. 17, a bracket 60 made of steel is also prepared by integrally securing an arm portion 62 to a cylindrical portion 61 in an arc-shaped portion 63 by spot welding, arc welding or other electrically welding method.

By press-fitting the drawn cylindrical rubber vibration isolator 50' in the cylindrical portion 61 of the thus prepared bracket 60, the engine mount provided with a bracket (FIG. 18) is obtained.

A fluid-filled rubber vibration isolator disclosed in Japanese patent application laid-open No. 2-46336, Japanese patent application laid-open No. 2-29898, U.S. Pat. No. 4,717,111 or the like is also provided with a bracket having an outer sleeve and a cylindrical portion, similarly to the above-described conventional cylindrical engine mount.

These conventional rubber vibration isolators with brackets, however, have problems that the outer sleeve 52 is needed as an essential component and that the process of press-fitting the drawn cylindrical rubber vibration isolator 50' in the cylindrical portion 61 of the bracket 60 is also needed.

SUMMARY OF THE INVENTION

Accordingly, it is an object of the present invention to provide a rubber vibration isolator with a bracket, which does not need any outer sleeve, and an improved method of manufacturing such a rubber vibration isolator without the press-fitting process of the cylindrical rubber vibration isolator in the bracket.

The rubber vibration isolator with a bracket in accordance with the present invention, has a bracket composed of a metallic cylindrical portion and a metallic arm portion integrally secured to an outer surface of the cylindrical portion by welding, an inner sleeve disposed inside of the cylindrical portion of the bracket so as to face the cylindrical portion with an annular space, and an elastic rubber member disposed in the annular space. The elastic rubber member has a first securing portion secured to an inner surface of the cylindrical portion of the bracket, and a second securing portion integrally bonded to an outer surface of the inner sleeve by vulcanization, and is in the precompressed state towards an axial center of the cylindrical portion of the bracket.

A first method of manufacturing a rubber vibration isolator with a bracket composed of a metallic cylindrical portion and a metallic arm portion secured to an outer surface of the cylindrical portion by welding in accordance with the present invention includes the steps of placing the cylindrical portion of the bracket separated from the arm portion within a cavity of a mold, placing an inner sleeve inside of the cylindrical portion, filling a space defined by the cylindrical portion and the inner sleeve with a rubber material, and vulcanizing the rubber material so that a vulcanized elastic rubber member is integrally bonded to both an inner surface of the cylindrical portion and an outer surface of the inner sleeve by vulcanization, thereby forming a vulcanized molded body, drawing the cylindrical portion of the vulcanized molded body to plastically deform it towards an axial center thereof, integrally securing the metallic arm portion to an outer surface of the plastically deformed cylindrical portion by welding to form the bracket composed of the cylindrical portion and the arm portion.

A second method of manufacturing such a rubber vibration isolator with a bracket in accordance with the present invention includes the steps of curving a flat sheet of metal to form the cylindrical portion having one pair of opposed free edges which face each other with a gap, placing the cylindrical portion within a cavity of a mold, placing an inner sleeve inside of the cylindrical portion, filling a space defined by said cylindrical portion and said inner sleeve with a rubber material, and vulcanizing the rubber material so that a vulcanized elastic rubber member is integrally bonded to both an inner surface of the cylindrical portion and an outer surface of the inner sleeve by vulcanization, thereby forming a vulcanized molded body, substantially reducing the diameter of the cylindrical portion of the vulcanized molded body by forcibly bringing the one pair of opposed free edges close to each other, abutting the metallic arm portion on the cylindrical portion in the diameter-reduced state so as to connect the one pair of opposed free edges, and integrally securing abutting faces of the metallic arm portion and the cylindrical portion by welding to form the bracket composed of the cylindrical portion and the arm portion.

A third method of manufacturing a rubber vibration isolator with a bracket composed of a metallic cylindrical portion and a metallic arm portion welded to an outer surface of the cylindrical portion in accordance with the present invention includes the steps of preparing the cylindrical portion and forming a cylindrical thin seal member of elastomer on an inner surface of the cylindrical portion, integrally bonding an inner sleeve of an external diameter less than the internal diameter of the cylindrical portion, a cylindrical elastic rubber member having a recess at an axially central portion, which is disposed on an outer surface of the inner sleeve, and metallic sleeves of an external diameter substantially equal to the internal diameter of the cylindrical portion, which are disposed on an outer surface of axially spaced end portions of the cylindrical elastic rubber member, by vulcanization, thereby forming a rubber bushing-like vulcanized molded body, relatively fitting the cylindrical portion and the rubber bushing-like vulcanized molded body in each other, drawing the cylindrical portion from the outside thereof towards an axial center thereof to substantially secure the cylindrical portion to the outer surface of the elastic rubber member, and securing the outer surface of the cylindrical portion and the metallic arm portion by welding, thereby forming the bracket composed of the cylindrical portion and the arm portion.

Welding the cylindrical portion and the arm portion is carried out by resistance welding. In order to prevent the degradation of the elastic rubber member due to heat upon welding, the surface temperature of the cylindrical portion contacting with the elastic rubber member must be controlled to 150° C. or less, preferably 130° C. or less. To this end, it is necessary to feed a large amount of current for a short time and then immediately cool the cylindrical portion. In addition, it is preferable to project one of abutting faces of the cylindrical portion and the arm portion to be welded and concentrate welding current only in the projected abutting faces. With this arrangement, the total amount of necessary welding current can be decreased and heat generation due to welding current can be reduced.

With the rubber vibration isolator with a bracket of the present invention, the elastic rubber member has the first securing portion secured to the inner surface of the cylindrical portion of the bracket and the second securing portion integrally bonded to the outer surface of the inner sleeve by vulcanization, and is retained between the cylindrical portion and the inner sleeve in the precompressed state. Therefore, good vibration isolating function substantially identical to that of the conventional arrangement is obtained. Furthermore, since the bracket is formed by securing the metallic arm portion to the outer surface of the cylindrical portion by welding, such an outer sleeve as required by the conventional arrangement is not needed.

With a first method of the present invention, after the metallic cylindrical portion of the vulcanized molded body is drawn, the metallic arm portion is secured to the outer surface of the cylindrical portion by resistance welding. Therefore, the elastic rubber member can be precompressed similarly to that of the conventional arrangement. Furthermore, the cylindrical portion also has a function identical to that of the outer sleeve of the conventional arrangement. Therefore, the outer sleeve is not needed, and accordingly, it is unnecessary to press-fit the rubber vibration isolator in the cylindrical portion.

With a second method of the present invention, by virtue of the process of forcibly bringing the opposed free edges of the cylindrical portion of the vulcanized molded body close to each other, the elastic rubber member can be precompressed. And in order to maintain this precompressed state, the arm portion is secured to the cylindrical portion so as to connect the opposed free edges thereof by resistance welding. As a result, the cylindrical portion without free edges is obtained, and the precompression of the elastic rubber member is ensured.

With a third method of the present invention, the arm portion is secured to the cylindrical portion by welding. Therefore, the bracket can be formed with the elastic rubber member precompressed.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Hereinafter, embodiments of the present invention will be explained with reference to FIGS. 1 through 12.

First Embodiment

Figure 1:
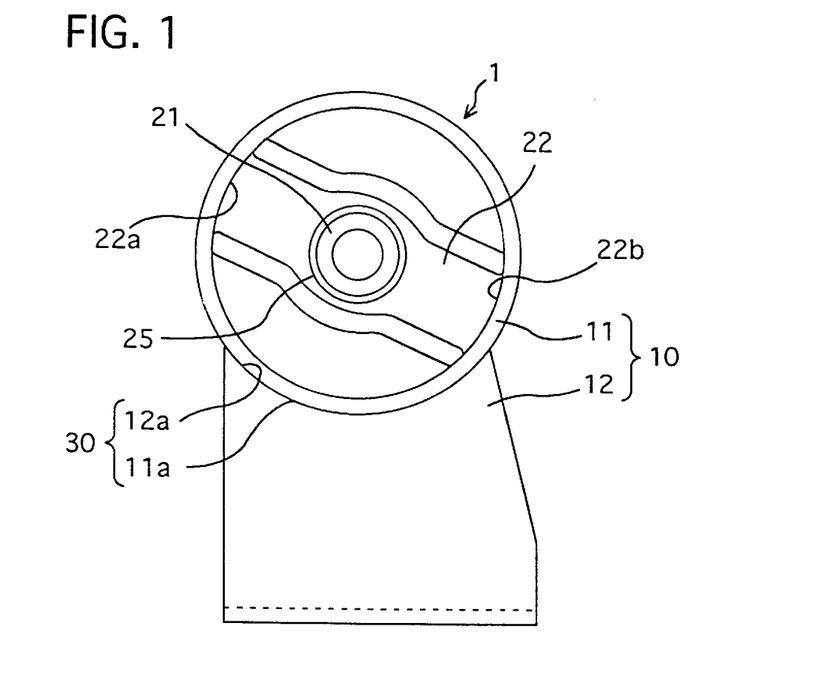
FIG. 1 is a front elevation view of a first embodiment of a rubber vibration isolator provided with a bracket in accordance with the present invention.
Figure 2:
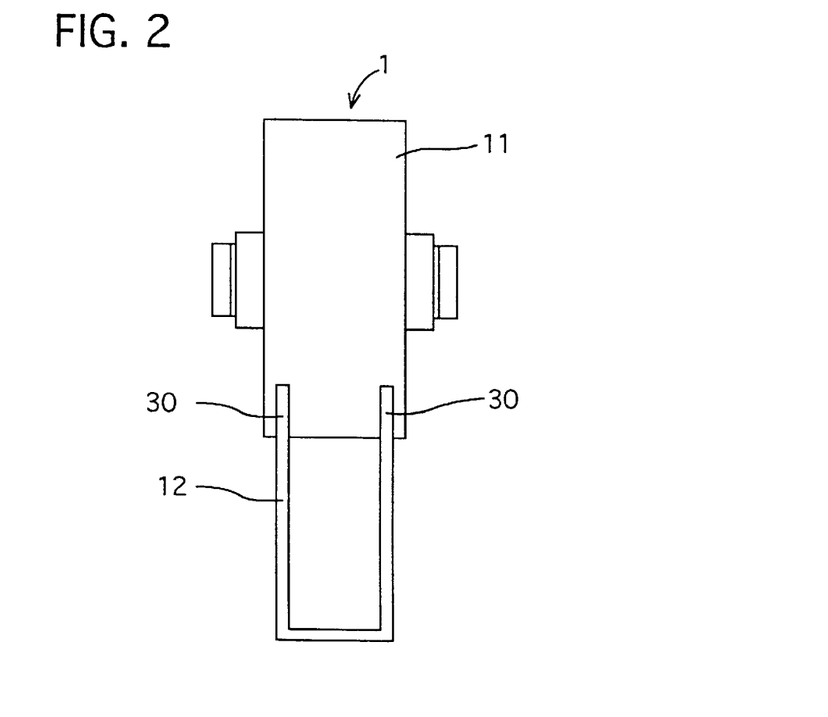
FIG. 2 is a side elevation view of the rubber vibration isolator of FIG. 1.

FIGS. 1 through 6 illustrate a first embodiment of the present invention. As shown In FIG. 1, a bracket 10 is composed of a cylindrical portion 11 of a ring-shaped cross-section and a plate-shaped arm portion 12. These portions 11 and 12 are both made of steel. A concavely curved arc-shaped end faces 12a of the arm portion 12 abut a convexly curved arc-shaped outer surface 11a of the cylindrical portion 11, and abutting faces 30 of both the arm portion 12 and the cylindrical portion 11 are welded to each other.

An inner sleeve 21 made of steel is disposed inside of the cylindrical portion 11 concentrically therewith, and a column-shaped elastic rubber member 22 is disposed in an annular space defined by the cylindrical portion 11 and the inner sleeve 21 to rectilinearly connect the cylindrical portion 11 and the inner sleeve 21 by vulcanization bonding. More specifically, the elastic rubber member 22 is integrally bonded to the inner surface of the cylindrical portion 11 on radially symmetrical left and right sides thereof in first securing portions 22a and 22b, and is also integrally bonded to the outer surface of the inner sleeve 21 in a second securing portion 25. Rubber stoppers made of the same rubber as that of the elastic rubber member 22 are vulcanization bonded to an inner surface of the cylindrical portion 11 so as to be spaced from the elastic rubber member 22 in the width direction thereof.

The diameter of the cylindrical portion 11 of the bracket 10 is reduced by drawing the cylindrical portion 11 radially inwardly with respect to the inner sleeve 21 substantially uniformly, thereby precompressing the elastic rubber member 22. Thus, the elastic rubber member 22 in the precompressed state receives a shear load applied to the cylindrical portion 11 or the inner sleeve 21.

Hereinafter, a first method of manufacturing a rubber vibration isolator with a bracket will be explained. First, the cylindrical portion 11 and the inner sleeve 21 are respectively prepared by cutting steel tubes of desired internal and external diameters into desired lengths. And the arm portion 12 (FIG. 6) is also prepared by bending a steel sheet.

Figure 3:
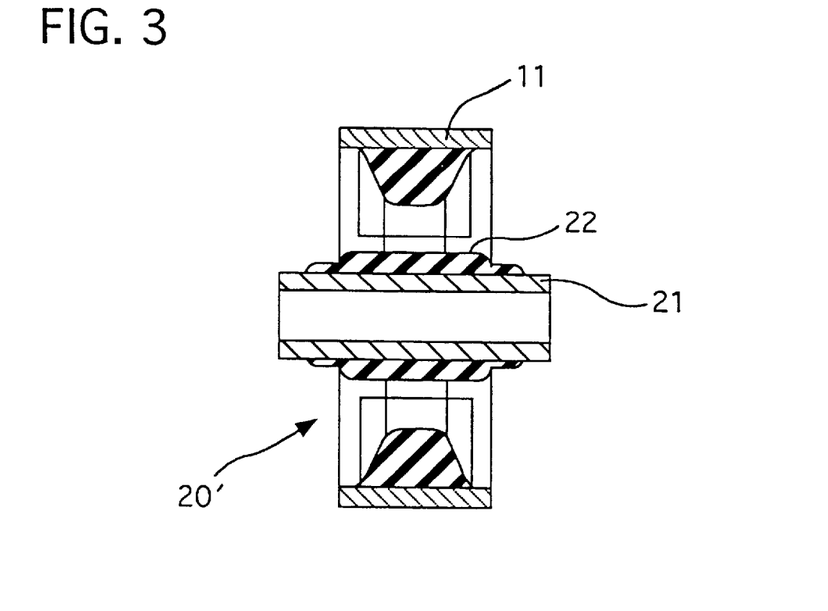
FIG. 3 is a longitudinal sectional view of a vulcanized molded body which is shown for explaining a first embodiment of the method of manufacturing the rubber vibration isolator with a bracket of FIG. 1.
Figure 4:
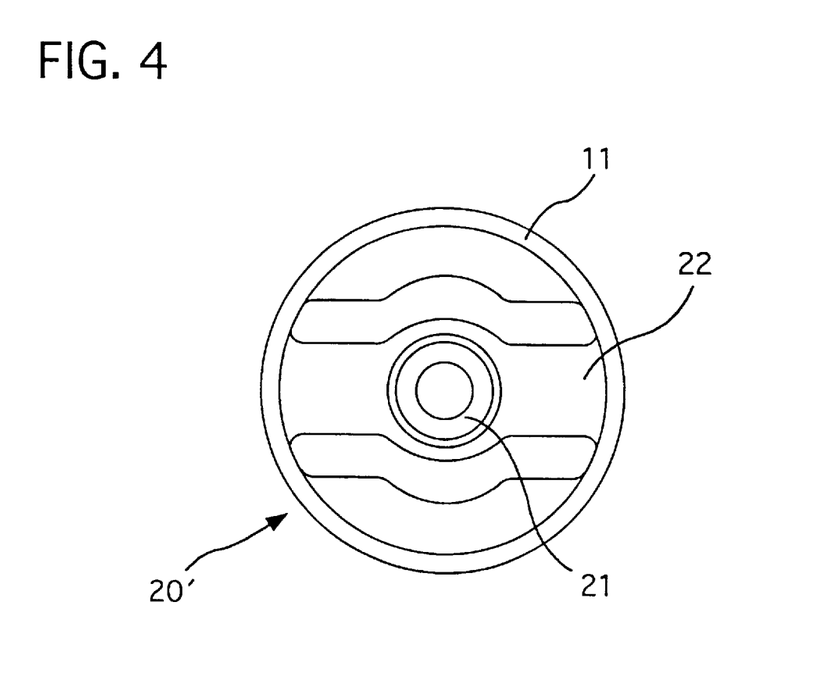
FIG. 4 is a front elevation view of a vulcanized molded body which is shown for explaining the first embodiment of the method of manufacturing the rubber vibration isolator with a bracket of FIG. 1.

Next, the cylindrical portion 11 is placed within a mold cavity, and the inner sleeve 21 is placed inside of the cylindrical portion 11. Then, a predetermined portion of a space defined by the cylindrical portion 11 and the inner sleeve 21 is filled with a rubber material, and the rubber material is vulcanized to form the elastic rubber member 22 and the rubber stoppers. As a result, as shown in FIGS. 3 and 4, the vulcanized molded body 20' wherein the vulcanized elastic rubber member 22 is integrally bonded to both the cylindrical portion 11 and the inner sleeve 21 by vulcanization is obtained. The cylindrical portion 11 of the vulcanized molded body 20' has an external diameter of 91 mm and a width of 35 mm.

Figure 5:
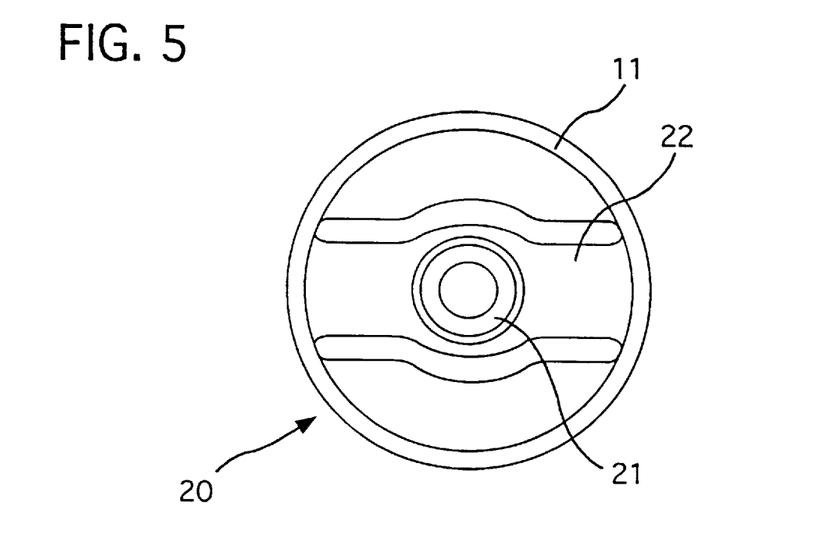
FIG. 5 is a front elevation view of a drawn vulcanized molded body obtained by drawing the vulcanized molded body of FIG. 3.
Figure 6:
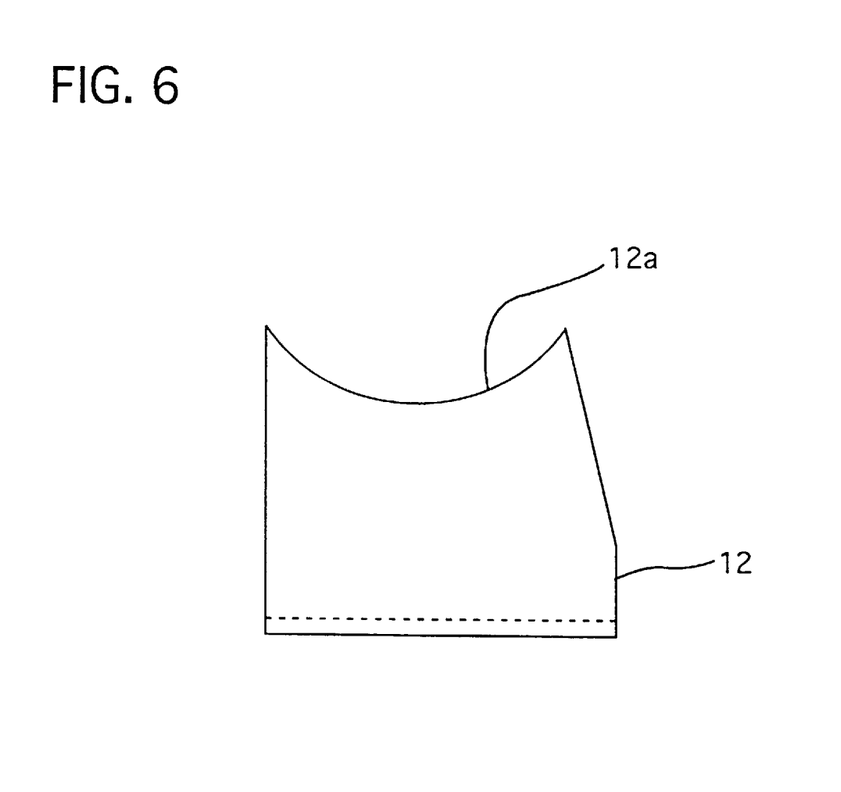
FIG. 6 is a front elevation view of an arm portion of the bracket of FIG. 1.

The cylindrical portion 11 of the vulcanized molded body 20' is drawn from the outside thereof towards the axial center thereof substantially uniformly by means of a well known drawing device (not shown). As a result, as shown in FIG. 5, the cylindrical portion 11 is plastically deformed such that the diameter thereof is reduced, and a drawn vulcanized molded body 20 of which the elastic rubber member 22 is in the precompressed state is obtained. Upon drawing, the external diameter of the cylindrical portion 11 is decreased to 85 mm, and the width thereof is increased to 38 mm.

Then, concavely curved arc-shaped end faces 12a of the arm portion 12 (FIG. 6) are abutted on a convexly curved arc-shaped portion 11a of the lower part of the outer surface of the cylindrical portion 11, and the abutting faces 30 of the cylindrical portion 11 and the arm portion 12 are welded to each other by means of a resistance welding machine. Due to welding current, the abutting faces 30 are molten into each other, thereby integrally securing the cylindrical portion 11 and the arm portion 12 to form the bracket. Thus, the rubber vibration isolator with a bracket 1 illustrated in FIG. 1 is manufactured. The rubber vibration isolator with a bracket 1 of the present embodiment has vibration isolating properties identical to those of the conventional arrangement.

In the present embodiment, the cylindrical portion 11 is formed by cutting a steel tube into a predetermined length.

Figure 7:
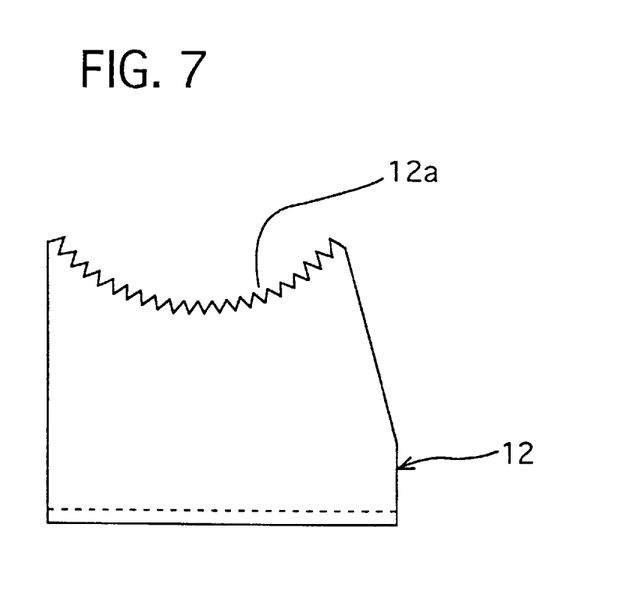
FIG. 7 is a front elevation view of another arm portion.

Instead, the cylindrical portion 11 can be formed by press-forming a sheet material into a cylindrical configuration. Furthermore, the concavely curved arc-shaped end faces 12a of the arm portion 12 may be formed irregular, as shown in FIG. 7. In this arrangement, resistance welding is carried out only in tip ends of projections of the irregular faces 12a so that the energy required for welding can be reduced. This results in the elastic rubber member 22 bonded to the inner surface of the cylindrical portion 11 being prevented from being degraded due to welding heat.

The projections of the irregular faces 12a may have a trapezoidal cross-section. The number of the projections may be one or more. The entire faces 12a may be formed irregular, as shown in FIG. 7.

Second Embodiment

Figure 8:
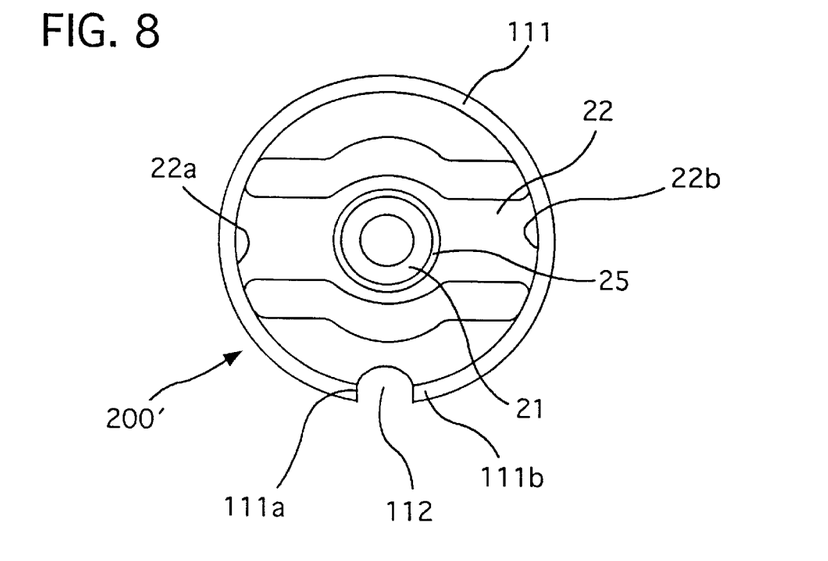
FIG. 8 is a front elevation view of a vulcanized molded body of a second embodiment.
Figure 9:
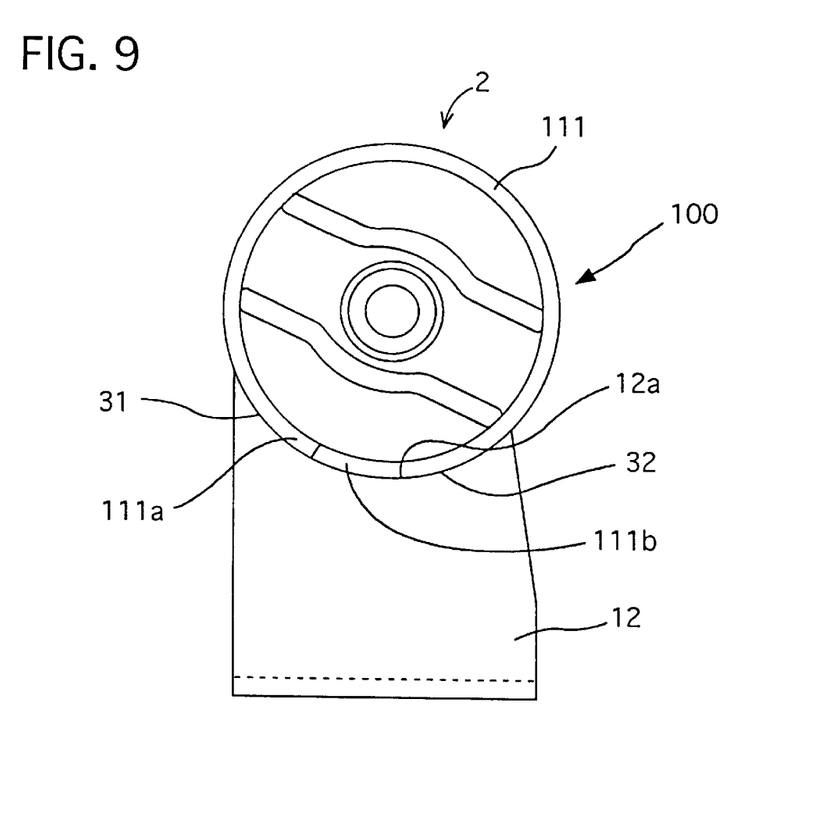
FIG. 9 is a front elevation view of a second embodiment of a rubber vibration isolator with a bracket, which is formed by reducing the diameter of the cylindrical portion of the vulcanized molded body of FIG. 8, and welding abutting faces of the cylindrical portion and the arm portion to each other.

FIG. 9 illustrates a second embodiment of a rubber vibration isolator with a bracket in accordance with the present invention. In the present embodiment, instead of the cylindrical portion 11 of the first embodiment, a cylindrical portion 111 of a configuration different from that of the cylindrical portion 11 is used. Namely, as shown in FIG. 8, the cylindrical portion 111 is formed by curving a sheet steel such that free edges 111a, 111b are opposed to each other through a gap 112, thereby having a C-shaped cross-section.

The thus formed C-shaped cylindrical portion 111 is placed in a mold cavity, an inner sleeve 21 is placed inside of the cylindrical portion 111, the space defined by the C-shaped cylindrical portion 111 and the inner sleeve 21 is filled with a rubber material, and the rubber material is vulcanized. As a result, a vulcanized molded body 200' (FIG. 8) wherein a vulcanized elastic member 22 is integrally bonded to both the cylindrical portion 111 and the inner sleeve 21 is prepared.

Next, by means of a gripping or fastening device (not shown), the opposed free edges 111a and 111b of the C-shaped cylindrical portion 111 are forcibly brought close to or into contact with each other to substantially reduce the diameter of the cylindrical portion 111. Then, as shown in FIG. 9, the concavely curved arc-shaped end faces 12a of the arm portion 12 are abutted on the lower part of the cylindrical portion 111 including the opposed free edges 111a and 111b. And both the abutting faces 31 on the side of the free edge 111a and the abutting faces 32 on the side of the free edge 111b are subjected to resistance welding by means of the above-described resistance welding device. Thus, the bracket 100 is formed, and accordingly the rubber vibration isolator with a bracket 2 is manufactured.

In the present embodiment, by closing the open free edges of the C-shaped cylindrical portion 111, the elastic rubber member 22 can be precompressed towards an axial center thereof. And, by welding the arm portion 12 to the cylindrical portion 111 so as to connect these closed edges, securing the arm portion to the cylindrical portion and closing the cylindrical portion are both carried out at the same time.

By virtue of resistance welding, the temperature of the cylindrical portion 111 contacting with the elastic rubber member 22 can be controlled to about 60° to 150° C. in an atmosphere of 24° C., and accordingly, the vibration isolating properties of the elastic rubber member 22 are not deteriorated. Therefore, the rubber vibration isolator with a bracket 2 of the present embodiment has excellent vibration isolating capacity and durability similarly to those of the conventional arrangement.

Third Embodiment

Figure 13:
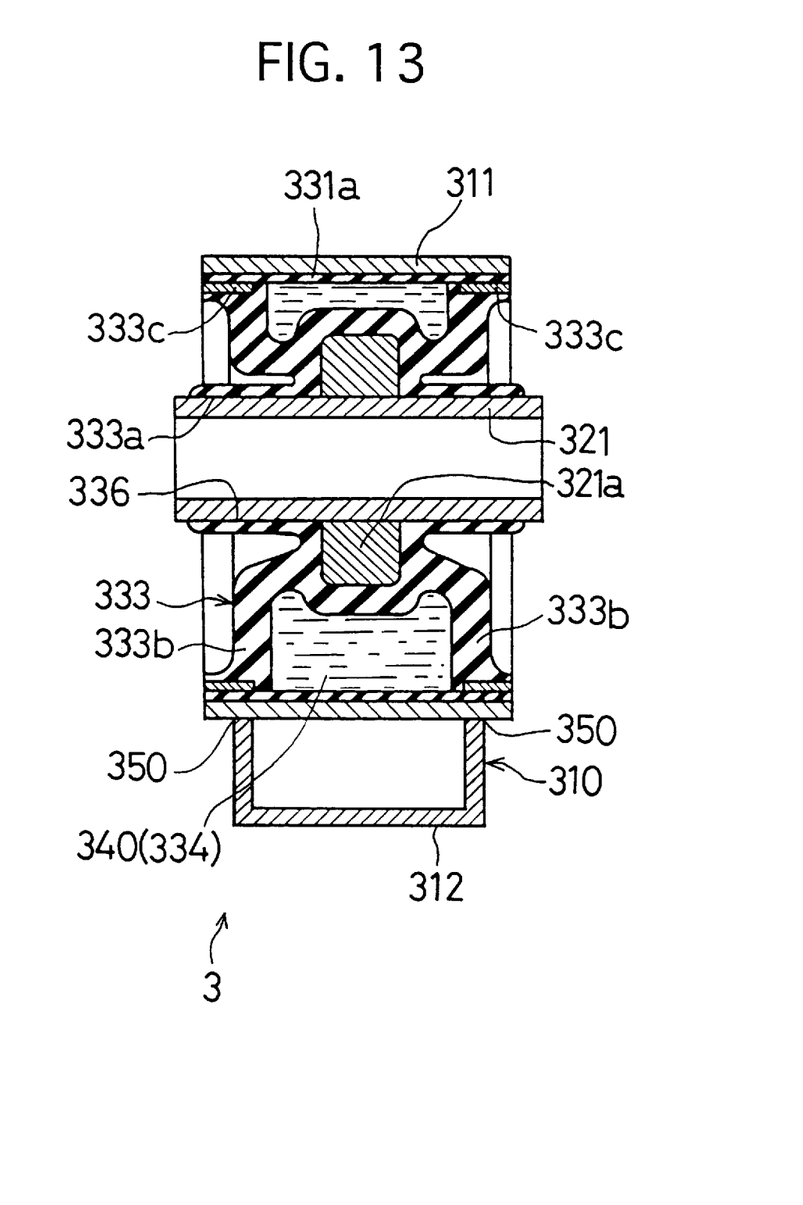
FIG. 13 is a front elevation view of a third embodiment of a rubber vibration isolator in accordance with the present invention.

FIG. 13 illustrates a third embodiment of a rubber vibration isolator with a bracket in accordance with the present invention. A rubber vibration isolator with a bracket 3 is used as a muffler support for a motor vehicle.

As shown, a bracket 310 is composed of a cylindrical portion 311 and an arm portion 312. These portions are both made of aluminum alloy. The arm portion 312 has a channel-like configuration and is integrally welded to an outer surface of the cylindrical portion 311.

Inside of the cylindrical portion 311, an inner sleeve 321 provided with a cylindrical stopper member 321a at an axially central portion thereof is disposed so as to be eccentric with the cylindrical portion 311. A cylindrical elastic rubber member 333 is disposed in a space defined by the cylindrical portion 311 and the inner sleeve 321. An inner surface 333a of the elastic rubber member 333 is integrally bonded to an outer surface of the inner sleeve 321 as a second securing portion 336.

The cylindrical elastic rubber member 333 is provided with annular side walls 333b, 333b which respectively extend radially outwardly and are bonded to side surfaces of the stopper member 321a. A recess 334 is defined by the side walls 333b, 333b. A metallic annular confined members 333c, 333c are integrally bonded to outer surfaces of the side walls 333b, 333b by vulcanization.

A cylindrical thin seal rubber 311a is integrally bonded to an inner surface of the cylindrical portion 311 of the bracket 310 by vulcanization. The cylindrical portion 311 provided with this cylindrical thin seal rubber 311a is subjected to the radially inward drawing operation against the metallic annular confined members 333c, 333c bonded to the cylindrical elastic rubber member 333. Thus, axially spaced end portions of the cylindrical elastic rubber member 333 come into close contact with the inner surface of the cylindrical portion 311 through the thin seal rubber 311a as the first securing portions 335, 335, and the cylindrical elastic rubber member 333 is in the precompressed state.

And the recess 334 is sealingly filled with a fluid such as water, alkylene glycol or the like to form an annular fluid chamber 340, thereby composing a fluid-filled rubber vibration isolator with a bracket 3.

In the present embodiment, the drawing operation is carried out in a fluid during filling the recess 334 with fluid. Instead, the drawing operation may be carried out in the air. In this case, after the drawing operation, the recess 334 is filled with fluid by using well known rivets.

Figure 10:
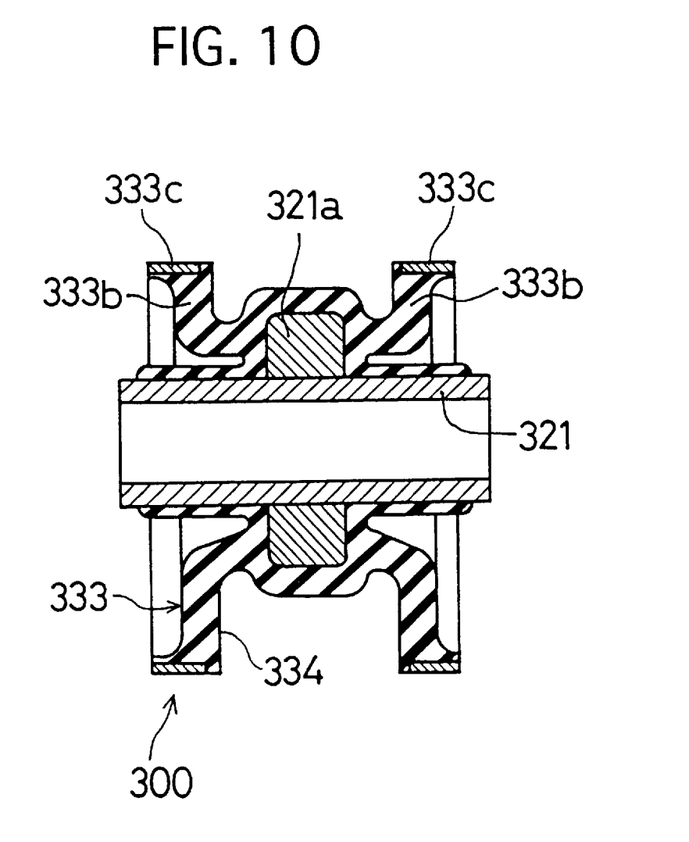
FIG. 10 is a cross-sectional view of a rubber bushing-like vulcanize molded body used in a third embodiment of the method in accordance with the present invention.
Figure 11:
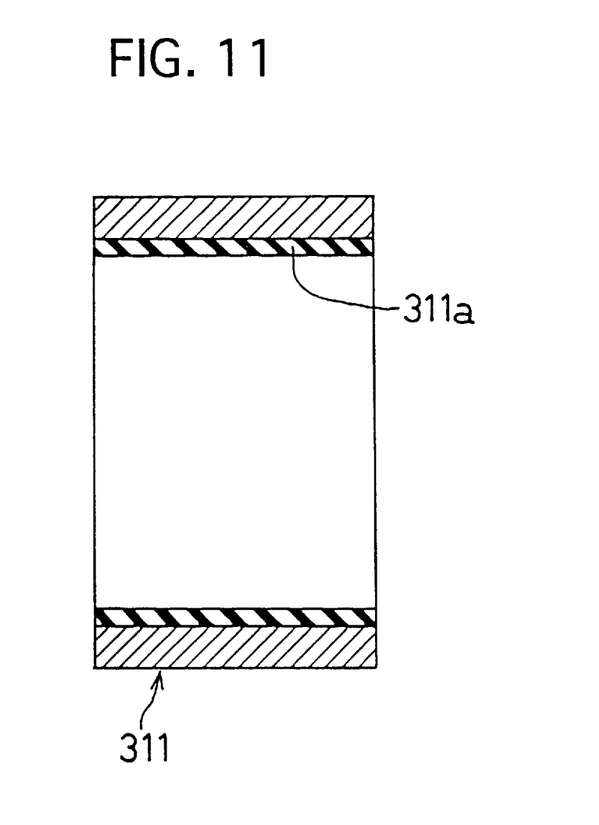
FIG. 11 is a cross-sectional view of a cylindrical portion used in the third embodiment.

Next, the manufacturing method of the fluid-filled rubber vibration isolator with a bracket 3 will be explained. As shown in FIGS. 10 and 11, a rubber bushing-like vulcanized molded body 300 wherein the cylindrical elastic rubber member 333 is integrally bonded to the outer surface of the inner sleeve 321 provided with the stopper member 321a by vulcanization, and the cylindrical portion 311 provided with the cylindrical thin seal rubber 311a which is bonded to the inner surface thereof by vulcanization are respectively prepared. In the rubber bushing-like vulcanized molded body 300, the radially outward extending annular side walls 333b, 333b which are respectively bonded to the side surfaces of the stopper member 321a, and the metallic annular confined members 333c, 333c are integrally bonded to each other by vulcanization. And the side walls 333b, 333b define the recess 334.

Figure 12:
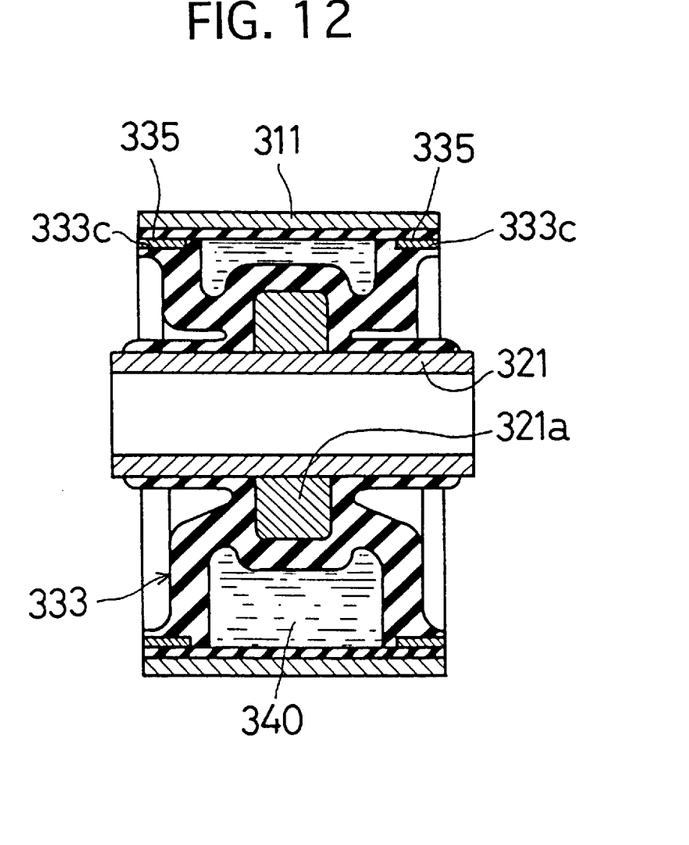
FIG. 12 is a cross-sectional view illustration the state of the rubber bushing-like vulcanized molded body of FIG. 10 being fitted into the cylindrical portion of FIG. 11 under liquid, and the cylindrical portion being subjected to the drawing work.

Then, the rubber bushing-like vulcanized molded body 300 is relatively fitted in the cylindrical portion 311 in a fluid such as alkylene glycol, and the cylindrical portion 311 is drawn from the outside towards the axial center thereof by using a well known drawing device (not shown) to reduce the diameter of the cylindrical portion with uniform. This results in the thin seal rubber 311a coming into contact with the outer surfaces of the metallic annular confined members 333c, 333c, and precompression being given to the cylindrical elastic rubber member 333. And at the same time, the recess 334 can be sealingly filled with the fluid such as alkaline glycol. Thus, as shown in FIG. 12, the annular fluid chamber 340 is formed.

In the next step, as shown in FIG. 13, the arm portion 312 is abutted on the outer surface the cylindrical portion 311, and the abutting faces 350 of the cylindrical portion 311 and the arm portion 312 are integrally welded to each other by the above-described resistance welding device to form the bracket 310. Thus, the fluid-filled rubber vibration isolator with a bracket 3 is manufactured.

By virtue of resistance welding, the temperature of the cylindrical portion can be prevented from rising above 150° C. Therefore, the obtained rubber vibration isolator with a bracket 3 can be semipermanently used as a rubber vibration isolator for a motor vehicle, similarly to the conventional arrangements.

The welding operation of the cylindrical portion and the arm portion is carried out by a resistance welding device manufactured at Banyou Kogyo Co., Ltd. Resistance welding enables securing the above-described portions without rising of the temperature of the cylindrical portion above 150° C. due to heat upon welding, and accordingly the vibration isolating properties and durability suitable to the rubber vibration isolator with a bracket for use in a motor vehicle can be obtained.

As described above, welding may be carried out such that the temperature of the cylindrical portion does not rise above 150° C. Therefore, other welding method such as arc welding is applicable provided that the temperature of the cylindrical portion can be prevented from rising by using a low temperature welding rod, or by welding in a liquid.

Furthermore, the cylindrical thin seal rubber 311a may be formed of a soft resin.

In accordance with the present invention, the rubber vibration isolator with a bracket, which does not need any outer sleeve, and the improved method of manufacturing the same, which does not need the press-fitting process of the outer sleeve in the bracket, can be provided. Accordingly, production costs can be reduced, as compared with the conventional arrangement.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A rubber vibration isolator comprising:

a bracket composed of a single piece metallic cylindrical portion and a metallic arm portion integrally secured to an outer surface of said single piece metallic cylindrical portion by welding;

an inner sleeve disposed inside of said single piece metallic cylindrical portion of said bracket so as to form an annular space with an inner surface of said single piece metallic cylindrical portion; and an elastic rubber member disposed in said annular space, said elastic rubber member having a first securing portion secured to said inner surface of said single piece metallic cylindrical portion and a second securing portion integrally bonded to an outer surface of said inner sleeve by vulcanization and being in a precompressed state towards an axial center of said single piece metallic cylindrical portion whereby the cylindrical portion solely maintains the elastic rubber member in the precompressed state;

said single piece metallic cylindrical portion being cylindrical sheet metal having opposed free edges facing each other and secured together whereby said single piece metallic cylindrical portion has the free edges spaced apart during the uncompressed securing and vulcanization formation and the free edges secured together to compress the elastic rubber member subsequent to securing and vulcanization formation.

2. A rubber vibration isolator with a bracket according to claim 1, wherein said first securing portion is composed of a vulcanization bonding portion of said elastic rubber member which is integrally bonded to said inner surface of said single piece metallic cylindrical portion by vulcanization.

3. A rubber vibration isolator with a bracket according to claim 1, wherein said single piece metallic cylindrical portion and said arm portion are integrally welded to each other by resistance welding.

* * * * *